United States Patent
Stewart et al.

(10) Patent No.: US 6,688,825 B1
(45) Date of Patent: Feb. 10, 2004

(54) NUT AND RETAINER FASTENER ASSEMBLY FOR SECURING A NUT TO A PANEL, AND METHOD OF FASTENER ASSEMBLY MANUFACTURE

(75) Inventors: Robert E. Stewart, Farmington Hills, MI (US); Carl Lewis, Sterling Heights, MI (US)

(73) Assignee: Alpha Stamping Company, Livonia, MI (US)

( * ) Notice: Subject to any disclaimer, the term of this patent is extended or adjusted under 35 U.S.C. 154(b) by 5 days.

(21) Appl. No.: 10/082,753

(22) Filed: Feb. 25, 2002

(51) Int. Cl.[7] ............................................. F16B 37/02
(52) U.S. Cl. ............................................. 411/174
(58) Field of Search ................... 411/174, 175, 411/111, 112, 119, 121

(56) References Cited

U.S. PATENT DOCUMENTS

| | | | |
|---|---|---|---|
| 716,018 A | 12/1902 | Feher | |
| 2,249,923 A | 7/1941 | Whitcombe | |
| 2,394,729 A | 2/1946 | Tinnerman | |
| 3,217,773 A | * | 11/1965 | Munse |
| 3,496,980 A | 2/1970 | Steward | |
| 3,669,170 A | * | 6/1972 | Schuster |
| 3,670,796 A | 6/1972 | Grimm | |
| 3,738,406 A | 6/1973 | Williams | |
| 4,375,933 A | 3/1983 | Hassler | |
| 4,385,858 A | * | 5/1983 | Bell |
| 4,440,535 A | 4/1984 | Oehlke | |
| 4,676,706 A | 6/1987 | Inaba | |
| 4,728,235 A | * | 3/1988 | Patti |
| 4,875,816 A | 10/1989 | Peterson | |
| 5,039,264 A | 8/1991 | Benn | |
| 5,538,377 A | 7/1996 | Stewart | |
| 5,558,369 A | 9/1996 | Cornea | |
| 5,893,694 A | 4/1999 | Wilusz | |
| 5,934,851 A | 8/1999 | Stewart | |
| 5,971,686 A | 10/1999 | Stewart | |
| 6,146,071 A | 11/2000 | Norkus | |
| 6,336,779 B1 | * | 1/2002 | Jakob |

* cited by examiner

Primary Examiner—Flemming Saether

(57) ABSTRACT

A fastener assembly includes a flexible resilient U-shaped retainer having first and second wall portions and a third wall portion interconnecting adjacent ends of the first and second wall portions such that the first wall portion overlies and is spaced from the second wall portion. The first wall portion of the retainer has a forward edge with laterally spaced tabs at opposed ends. The tabs extend toward the second wall portion and have flat ends spaced from the second wall portion of the retainer. A flange nut is mounted on the first wall portion of the retainer, and has a flange disposed within the first wall portion and spaced from the second wall portion.

21 Claims, 3 Drawing Sheets

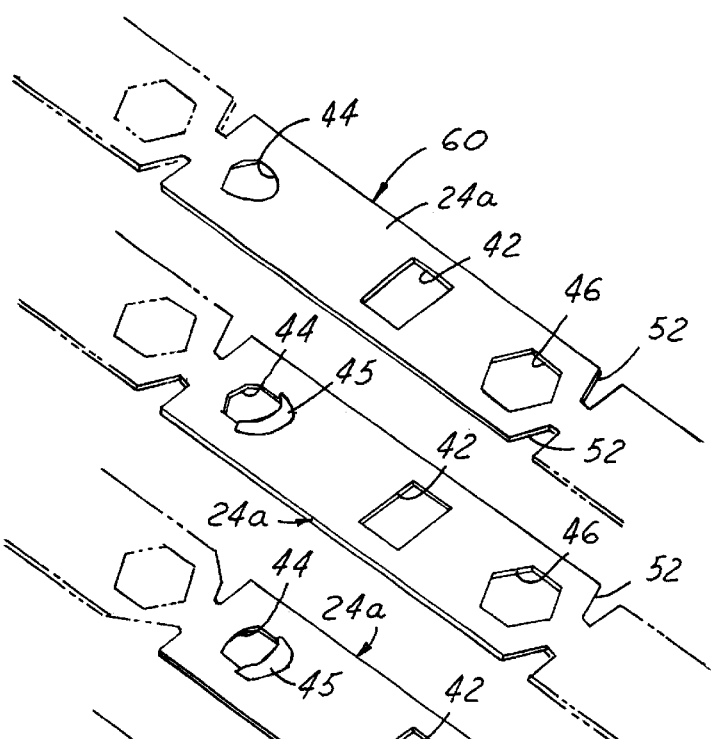
FIG.6A
FIG.6B
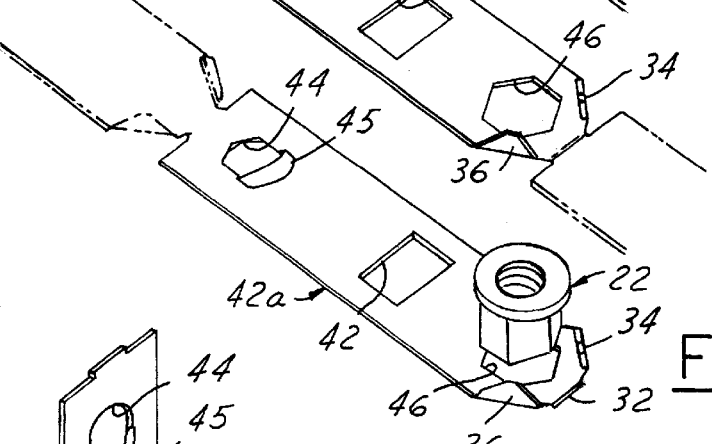
FIG.6C
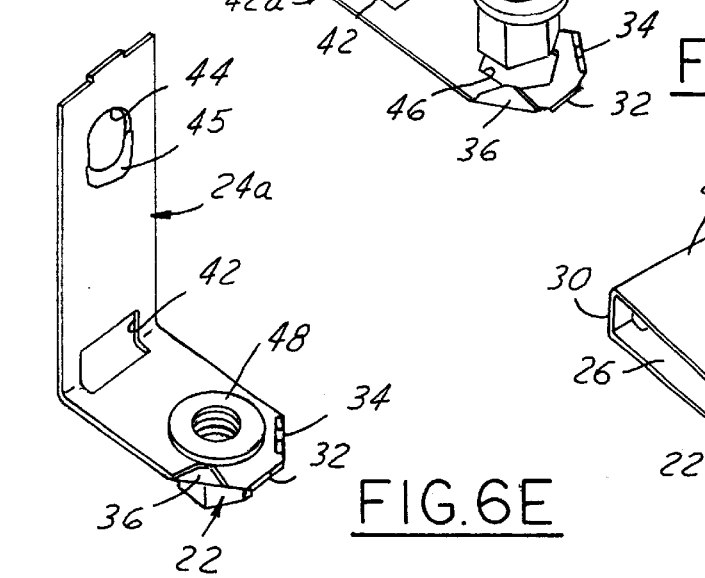
FIG.6D
FIG.6E
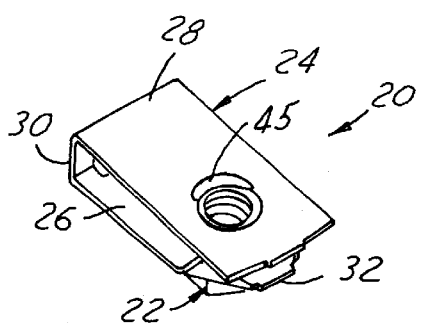
FIG.6F

NUT AND RETAINER FASTENER ASSEMBLY FOR SECURING A NUT TO A PANEL, AND METHOD OF FASTENER ASSEMBLY MANUFACTURE

The present invention is directed to a nut and retainer fastener assembly for securing the nut to a panel or the like, and to a method of fastener assembly manufacture.

BACKGROUND AND OBJECTS OF THE INVENTION

U.S. Pat. No. 3,496,980 discloses a nut and retainer fastener assembly in which a flange nut is secured to the upper portion or wall of a U-shaped sheet metal retainer. The upper wall of the retainer is embossed during the forming operation to provide clearance for the nut flange. The forward edge of the upper wall terminates in a V-shaped bend that extends laterally across the retainer and functions to expand the retainer during installation over the edge of a panel. The corners of the nut are staked, so that the embossed portion of the retainer is captured between the nut flange and the stakes to mount the nut on the retainer. The sheet metal retainers are formed and the nuts are assembled to the retainers in a progressive blanking, bending and assembly operation.

Embossment of the portion of the retainer on which the nut is mounted subjects the retainer to severe dimensional distortions due to stretching of material, and increases tooling cost and tooling wear. Manufacturing techniques are employed that result in excessive material waste. Furthermore, distortion of the retainer makes it difficult to retain close tolerances in the assembly. The fastener design and associated manufacturing tooling are not readily modifiable for different nut sizes and/or different panel thicknesses. Furthermore, the elongated contact area between the retainer and the panel during assembly, together with stiffness of the retainer, can make it difficult to install the nut and retainer fastener assembly onto a panel. It is a general object of the present invention to provide a nut and retainer fastener assembly, and a method of manufacture, that address and ameliorate one or more of these deficiencies in the prior art.

SUMMARY OF THE INVENTION

A fastener assembly in accordance with a first aspect of the present invention includes a retainer having first and second wall portions and a third wall portion interconnecting adjacent ends of the first and second portions such that the first portion overlies and is spaced from the second portion. The first wall portion of the retainer has a forward edge remote from the third wall portion. This forward edge includes laterally spaced tabs at opposed ends of the forward edge, with the tabs extending toward the second wall portion and having free ends spaced from the second portion of the retainer. A flange nut is mounted on the first wall portion of the retainer, and has a flange disposed within the first portion and spaced from the second portion.

The tabs preferably have straight edges contiguous with the forward edge of the first wall portion and oriented at an acute angle to the first portion. These angulated edges on the tabs facilitate installation of the assembly onto a panel by providing essentially point-areas of contact between the retainer and the edge of the panel, and by camming the first wall portion of the retainer away from the second wall portion—i.e., opening the retainer—during installation onto the panel. In the preferred embodiment of the invention, the acute angle between the forward edges of the tabs and the edge of the first wall portion of the retainer is in the range of zero to 90°, and most preferably about 60°. The second wall portion of the retainer has an opening for extending a threaded fastener into the nut, and preferably has a locating tab adjacent to such opening for locating the retainer with respect to an opening in the panel when the assembly is secured to the panel. An opening or cut-out in the first and third wall portions of the retainer preferably increases flexibility of the retainer, further to reduce installation force during assembly onto a panel. The flange nut preferably comprises a hex nut having stakes at less than all corners of the nut, preferably at two or three corners of the nut, leaving the remaining corners for use in disassembly of a fastener from the nut.

A fastener assembly in accordance with another aspect of the present invention includes a one-piece U-shaped sheet metal retainer having first and second planar wall portions and a third wall portion interconnecting adjacent ends of the first and second wall portions such that the first wall portion overlies and is spaced from the second wall portion. The first wall portion of the retainer has a forward edge with laterally spaced tabs extending toward the second wall portion with free ends spaced from the second wall portion. The free ends are flat and are parallel to the first wall portion. A flange nut is mounted on the first wall portion of the retainer. The flange nut has a flange disposed within the first wall portion and spaced from the second wall portion. The tabs extend from the first wall portion by an mount sufficient that the assembly can be secured over an edge on a panel without interference between the panel edge and the nut flange.

A method of making a fastener assembly in accordance with a third aspect of the present invention includes forming a metal retainer in a progressive blanking and bending operation. The metal retainer is U-shaped, having first and second flat wall portions interconnected by a third wall portion. The first wall portion has an opening and a forward edge with laterally spaced tabs extending toward the second wall portion at opposed ends of the forward edge. The free ends of the tabs are spaced from the second wall portion. A flange hex nut is secured within the opening in the first wall portion, preferably by staking at less than all corners of the nut.

BRIEF DESCRIPTION OF THE DRAWINGS

The invention, together with additional objects, features and advantages thereof, will be best understood from the following description, the appended claims and the accompanying drawings in which:

FIGS. 6A–6F illustrate successive stages of manufacture of the fastener assembly illustrated in FIGS. 1–5.

DETAILED DESCRIPTION OF PREFERRED EMBODIMENTS

Figure 1:
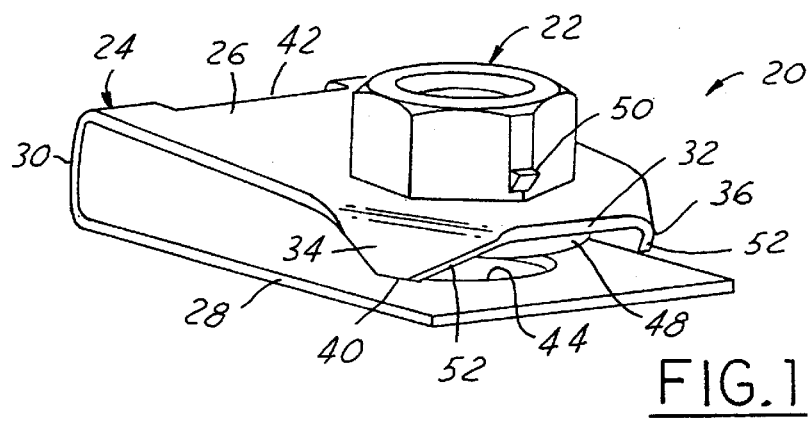
FIG. 1 is a front perspective view of a fastener assembly in accordance with a presently preferred embodiment of the invention.
Figure 2:
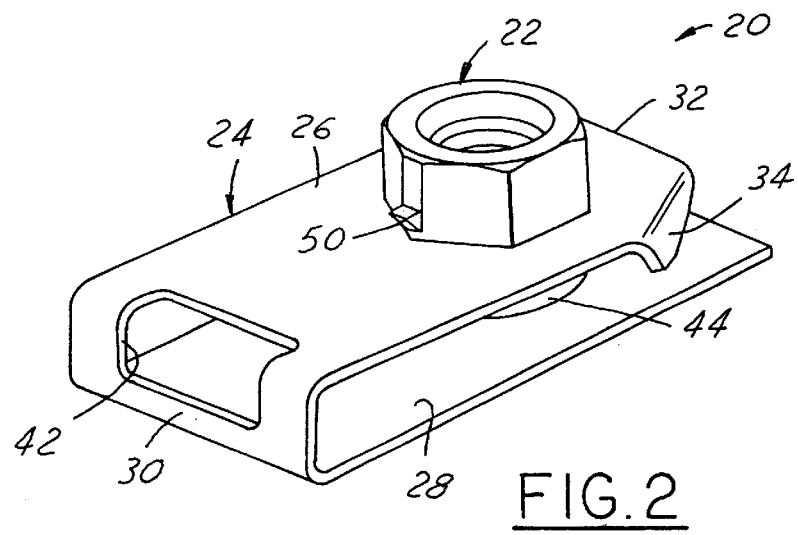
FIG. 2 is a rear perspective view of the fastener assembly illustrated in FIG. 1.

FIGS. 1–5 illustrate a fastener assembly 20 in accordance with one presently preferred embodiment of the invention as comprising a flange hex nut 22 mounted on a retainer 24. Retainer 24 is a clip-type retainer that preferably is of one-piece U-shaped flexible resilient sheet metal construction, including a flat first or upper wall portion 26, a flat second or lower wall portion 28, and a third wall portion 30 integrally interconnecting adjacent ends of first and second wall portions 26, 28. (Directional words such as "upper," "lower" and "forward" are employed by way of description and not limitation with respect to the orientation of the fastener assembly illustrated in FIGS. 1–5. All dimensions are nominal, and are given by way of example only.) Retainer 24 is formed in a progressive blanking and bending operation (FIGS. 6A–6F) from an elongated sheet metal strip of uniform thickness having parallel side edges. Thus, upper wall portion 26 and lower wall portion 28 are flat and rectangular, having side edges disposed in parallel planes. The forward edge 32 of first wall portion 26 includes laterally spaced tabs 34, 36 at opposite side ends of forward edge 32. Each tab 34, 36 (which preferably are identical) extends toward second wall portion 28, and has a free end 40 spaced from the opposing surface of portion 28. A rectangular opening or cutout 42 preferably is formed in third wall portion 30 and extends upwardly into first wall portion 26 midway between the side edges of the retainer. A clearance opening 44 is formed in second wall portion 28 for passage of a threaded fastener into nut 22. As fabricated (FIGS. 1–3), wall portion 26 is angled toward wall portion 28. In use (FIGS. 4 and 7–9), wall portion 26 is nominally parallel to wall portion 28, although this will depend upon the thickness of the panel to which the assembly is mounted.

Nut 22 preferably comprises a flange hex nut received through a hexagonal opening 46 (FIGS. 6A–6D) in wall portion 26 of retainer 24. The flange 48 of nut 22 is disposed between wall portions 26, 28 of retainer 24. Stakes 50 are struck at corners of nut 22 to secure the nut in position on the retainer. Stakes 50 can extend to wall portion 26 of retainer 24 tightly to clamp the retainer between the stakes and nut flange 48. However, it is preferable to terminate stakes 50 in such a way that nut 22 is loosely retained on retainer 24 so that the nut can be self-aligning with the fastener to accommodate tolerance variations and differing panel thicknesses within a given design range. Stakes 50 can be formed on all six corners of nut 22. However, it is preferable to form stakes 50 on less than all of the nut corners, such as on two or three of the six nut corners, leaving the other three or four nut corners undistorted and usable in connection with a wrench or the like. Tabs 34, 36 preferably extend toward lower retainer wall portion 24 by a distance sufficient to enclose flange 48, as best seen in FIGS. 3 and 4, so that retainer assembly 20 can be assembled to a panel without interference between the panel edge and the nut flange.

Tabs 34, 36 preferably are in the form of identical truncated triangles, having straight forward edges 52 at an acute angle with respect to retainer wall portion 26. When the fastener assembly is assembled over a panel 54 (FIGS. 3 and 4), forward edges 52 of tabs 34, 36 engage the edge of the panel along virtually point-areas of contact, reducing the force required for assembly and camming retainer portion 26 away from retainer portion 28 during such assembly. Free ends 40 of tabs 34, 36 preferably are flat and parallel to the plane of upper wall portion 26. In this way, when the retainer is fully assembled onto the panel as illustrated in FIG. 4, retainer wall portion 26 is (nominally) parallel to the opposing surface of panel 54, and tab free ends 40 are in area contact (as distinguished from point contact) with the opposing surface of the panel. This helps reduce gouging of the panel and increases stability of the retainer and nut assembly with respect to the panel. Opening or cut-out 42 along the rear edge of the retainer increases flexibility of wall portion 26 with respect to wall portion 28, and thus further reduces the force required for assembling the retainer onto a panel. A tab 45 (optional) on wall portion 28 cams retainer portion 28 downwardly, and then locates within the mounting opening 56 on panel 54. This helps hold the retainer assembly in position until a fastener can be inserted through the through opening 44 into nut 22.

Figure 3:
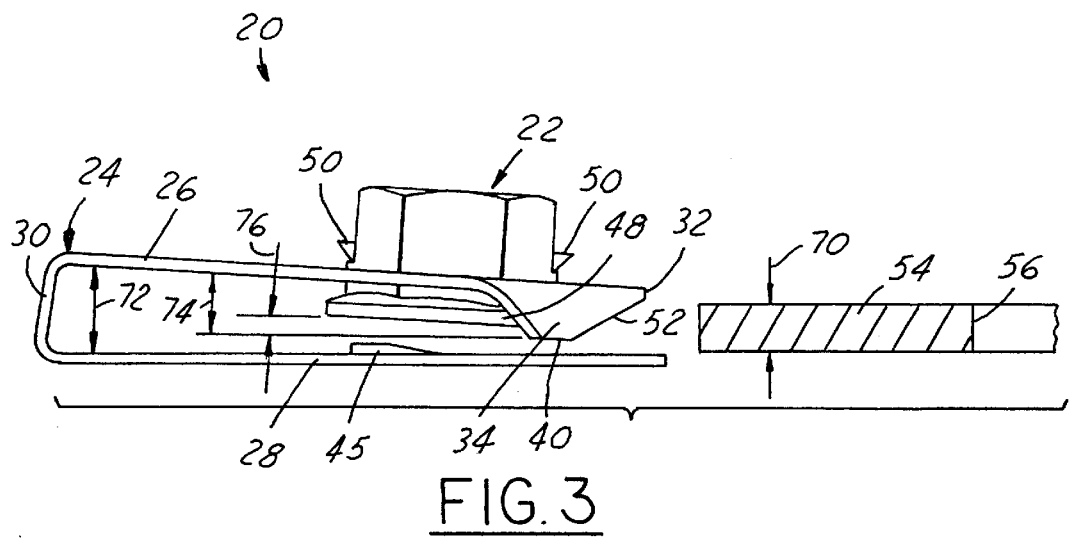
FIG. 3 is a side elevational view of the fastener assembly illustrated in FIGS. 1 and 2 prior to installation over the edge of a panel.
Figure 4:
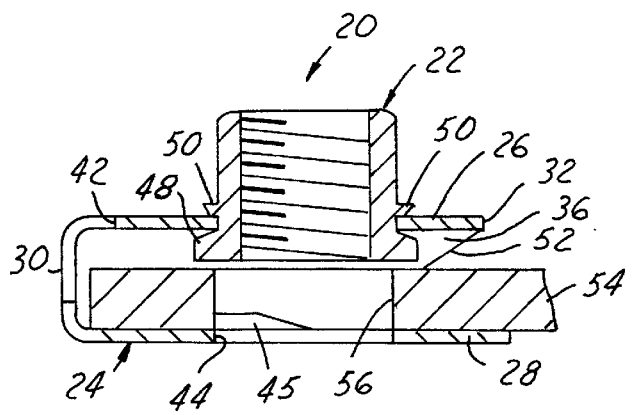
FIG. 4 is a sectioned elevational view of the fastener assembly of FIGS. 1–3 after installation over a panel.
Figure 5:
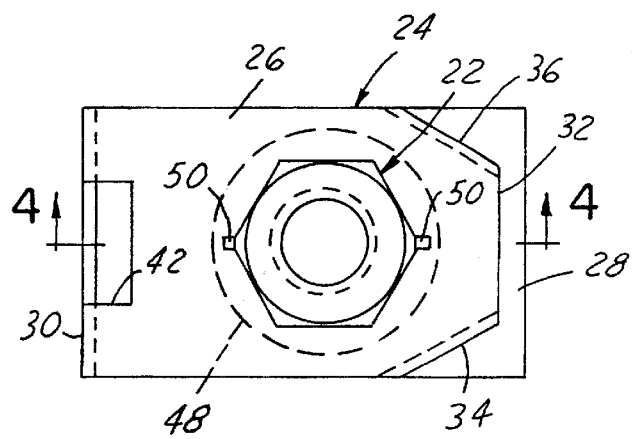
FIG. 5 is a top plan view of the fastener assembly illustrated in FIGS. 1–4.

Referring to FIG. 3, fastener assembly 20 is designed for use in conjunction with a panel 54 having a nominal thickness 70. The inside distance 72 between wall portions 26, 28 adjacent to wall portion 30 is equal to nominal panel thickness 70 plus the length 74 of tabs 34, 36 beneath the undersurface of wall portion 26. In this way, wall panels 54 of nominal thickness 70, wall portion 26 will be parallel to wall portion 28 and the axis of nut 22 will be parallel to the axis of panel opening 56. If panel 54 departs from nominal thickness 70, the retainer wall portions will be slightly non-parallel. However, the preferred loose retention of the nut in the retainer, as previously described, allows the nut to cock slightly during assembly with a threaded fastener. Tabs 34, 36 are dimensioned to provide clearance 76 between the underside of nut flange and surfaces 40 of tabs 34, 36.

Figure 7:
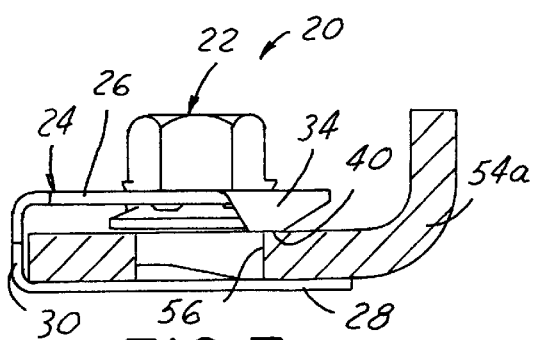
FIGS. 7–9 illustrate assembly of the fastener assembly to panels of differing contour.
Figure 8:
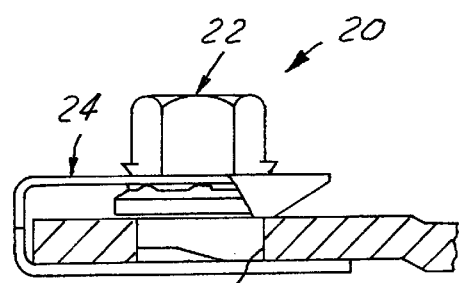
Figure 9:
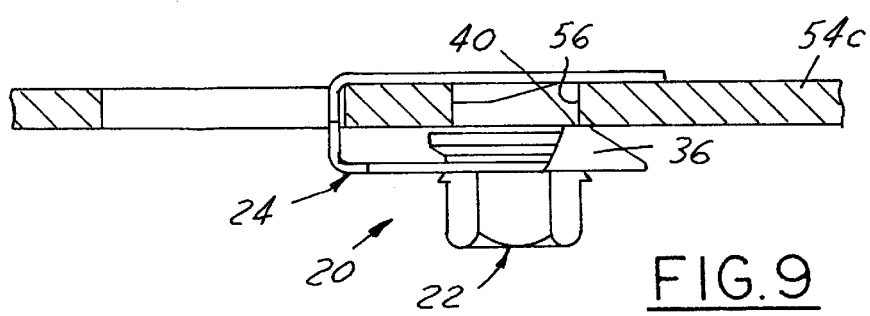

FIGS. 6A–6F illustrate manufacture of fastener assembly 20 in accordance with another aspect of the preferred embodiment of the invention. Retainer 24 is initially provided in the form of an elongated sheet-metal strip 60. Openings 42, 44, 46 are stamped into strip 60, as are edges 52, in the initial step of FIG. 6A. In FIG. 6B, tab 45 is stamped upwardly in the rear portion of each section 24 a of strip 60 in succession. In FIG. 6C, tabs 34, 36 are struck upwardly from the forward edge of each section 24 a perpendicular to the plane of section 24a. Nut 22 is then inserted through opening 46 in section 24 a (FIG. 6D). Nut 22 is then staked to retainer section 24a, and retainer section 24a is bent in FIGS. 6E and 6F to form the final retainer configuration 24. It will be appreciated that there is very little wastage of material in this progressive blanking, bending and securing operation. FIGS. 7–9 illustrate retainer assembly 20 secured to panels 54a, 54b and 54c of differing configurations.

There has thus been described a fastener assembly and method of manufacture that fully obtain all of the objects and aims previously set forth. In particular, the fastener assembly of the preferred embodiment reduces tooling complexity and cost, and facilitates manufacture of the assembly. The fastener assembly is easy to install onto a panel, and the tooling can be readily modified for differing nut sizes and/or differing panel thicknesses. The fastener assembly in accordance with the present invention readily accommodates nuts 22 of SAE property classes 8,9 or 10 having prevailing torque features of metallic, non-metallic or free running type. Tabs 34,36 preferably terminate at flat free ends 40, and preferably have straight leading edges 52 as described. However, tabs 34,36 could be rounded, having arcuate forward edges and/or arcuate free ends for contact with the opposing surface of the panel. Opening or cut-out 42 can readily be redimensioned for increasing or decreasing the force required for installation of the fastener assembly onto a panel. Likewise, tab edges 52 can be angled more steeply or shallowly to increase or decrease the installation force. Other modifications and variations will readily suggest themselves to persons of ordinary skill in the art. The invention is intended to embrace all such modifications and variations as fall within the spirit and broad scope of the appended claims.

What is claimed is:

1. A fastener assembly that includes:

a retainer having first and second wall portions and a third wall portion interconnecting adjacent ends of said first and second wall portions such that said first wall portion overlies and is spaced from said second wall portion, said first wall portion having a forward edge remote from said third wall portion, said forward edge including laterally spaced tabs at opposed ends of said forward edge and contiguous with said first wall portion, said tabs extending toward said second wall portion perpendicular to said first wall portion and having free ends spaced from said second wall portion, and a flange nut mounted on said first wall portion, said flange nut having a flange disposed within said first wall portion and spaced from said second wall portion.

2. The fastener assembly set forth in claim 1 wherein said tabs have straight edges contiguous with said forward edge of said first wall portion.

3. The fastener assembly set forth in claim 2 wherein said straight edges of said tabs are at an acute angle to said first wall portion.

4. The fastener assembly set forth in claim 3 wherein said acute angle is in the range of zero to 90°.

5. The fastener assembly set forth in claim 4 wherein said acute angle is 60°.

6. The fastener assembly set forth in claim 1 wherein said tabs have flat ends opposed to said second wall portion.

7. The fastener assembly set forth in claim 6 wherein said flat ends of said tabs are parallel to said first wall portion.

8. The fastener assembly set forth in claim 1 wherein said retainer is U-shaped.

9. The fastener assembly set forth in claim 8 wherein said second wall portion has an opening for extending a threaded fastener into said nut.

10. The fastener assembly set forth in claim 9 wherein said second wall portion includes a locating tab adjacent to said opening for locating said retainer with respect to an opening in a panel when said assembly is secured to the panel.

11. The fastener assembly set forth in claim 8 wherein said retainer includes an opening in said first and third wall portions for increasing resilient flexibility of said retainer.

12. The fastener assembly set forth in claim 1 wherein said flange nut comprises a hex nut having stakes at less than all corners of said nut mounting said nut to said first wall portion.

13. A fastener assembly that includes:

a one-piece U-shaped flexible resilient sheet metal retainer having first and second planar wall portions and a third wall portion interconnecting adjacent ends of said first and second wall portions such that said first wall portion overlies and is spaced from said second wall portion, said first wall portion having a forward edge remote from said third wall portion, said forward edge including laterally spaced tabs extending toward said second wall portion and having free ends spaced from said second wall portion, said free ends being flat and parallel to said first wall portion, and a flange nut mounted on said first wall portion, said flange nut having a flange disposed within said first wall portion and spaced from said second wall portion, said tabs extending from said first wall portion by an amount sufficient that said assembly can be secured over an edge on a panel without interference between the panel edge and said flange.

14. The fastener assembly set forth in claim 13 wherein said tabs have straight edges contiguous with said forward edge of said first wall portion.

15. The fastener assembly set forth in claim 14 wherein said straight edges of said tabs are at an acute angle to said first wall portion.

16. The fastener assembly set forth in claim 13 wherein said second wall portion has an opening for extending a threaded fastener into said nut, and wherein said second wall portion includes a locating tab adjacent to said opening for locating said retainer with respect to an opening in a panel when said assembly is secured to the panel.

17. The fastener assembly set forth in claim 13 wherein said retainer includes an opening in said first and third wall portions for increasing resilient flexibility of said retainer.

18. The fastener assembly set forth in claim 13 wherein said flange nut comprises a hex nut having stakes at less than all corners of said nut mounting said nut to said first wall portion.

19. A method of making a fastener assembly that comprises the steps of:

(a) forming a flexible resilient metal retainer in a progressive blanking and bending operation, said metal retainer being U-shaped having first and second flat wall portions interconnected by a third wall portion, said first wall portion having an opening and a forward edge with laterally spaced tabs extending toward said second wall portion at opposed edges of said first wall portion perpendicular to said first wall portion and having free ends spaced from said second wall portion, and (b) securing a flange hex nut within said opening in said first wall portion.

20. The method set forth in claim 19 wherein said step (b) is carried out by staking at less than all corners of said nut.

21. A fastener assembly that includes:

a retainer having first and second wall portions and a third wall portion interconnecting adjacent ends of said first and second wall portions such that said first wall portion overlies and is spaced from said second wall portion, said first wall portion having a forward edge remote from said third wall portion, said forward edge including laterally spaced tabs at opposed ends of said forward edge, said tabs extending toward said second wall portion and having free ends spaced from said second wall portion, and said tabs having flat ends opposed to said second wall portion and said flat ends of said tabs being parallel to said first wall portion, and a flange nut mounted on said first wall portion, said flange nut having a flange disposed within said first wall portion and spaced from said second wall portion.

* * * * *